June 12, 1928.
G. G. GILPIN
END DOOR FOR AUTOMOBILE CARS
Filed Nov. 1, 1926
1,673,450
2 Sheets-Sheet 1
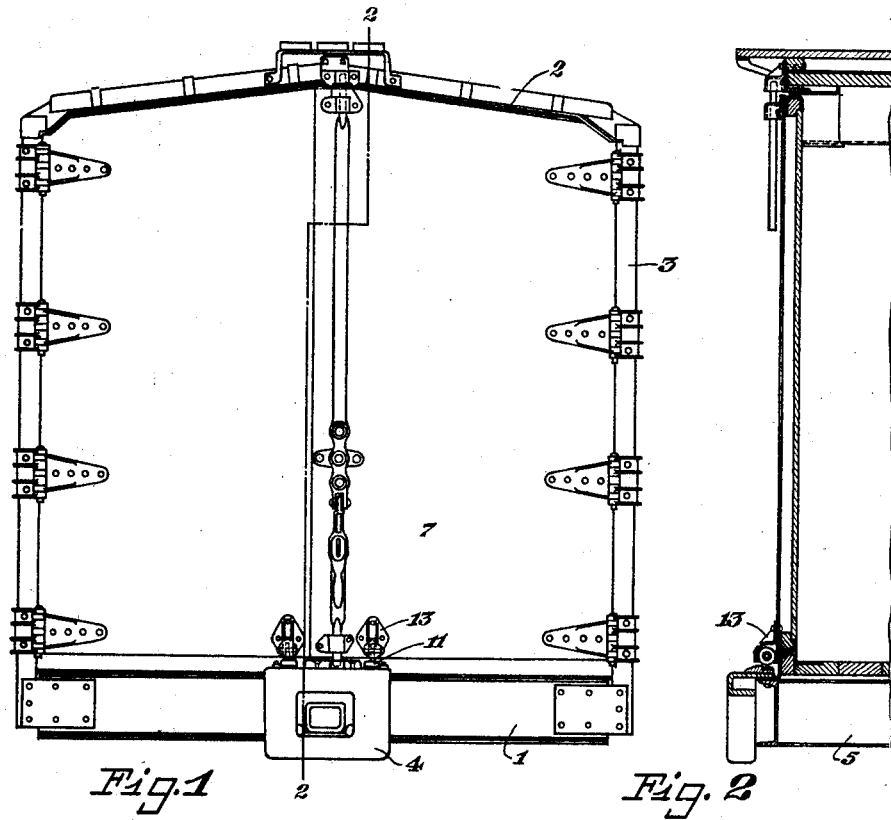
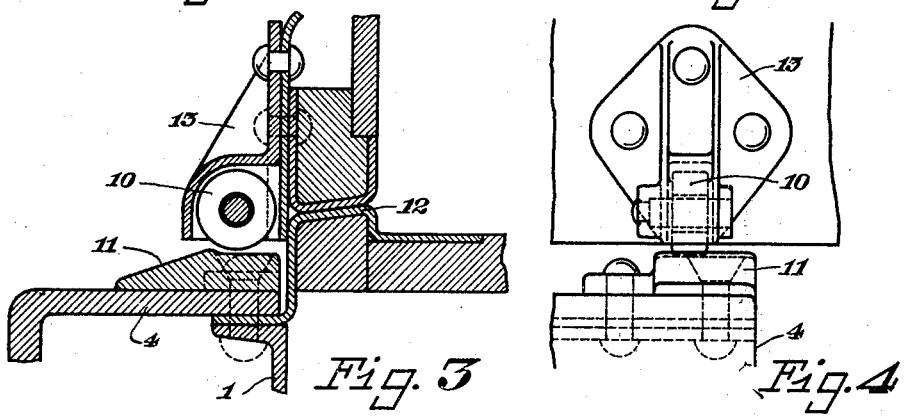
Inventor:
Garth G. Gilpin
Clinton W. Nelisson
Attorney Inventor
Garth G. Gilpin
Vinton E. Sisson.
Attorney Patented June 12, 1928.

1,673,450

UNITED STATES PATENT OFFICE.

GARTH G. GILPIN, OF RIVERSIDE, ILLINOIS, ASSIGNOR TO UNION METAL PRODUCTS COMPANY, OF CHICAGO, ILLINOIS, A CORPORATION OF DELAWARE.

END DOOR FOR AUTOMOBILE CARS.

Application filed November 1, 1926. Serial No. 145,506.

Reference is had to the accompanying drawings which illustrate the preferred form of the invention, though it is to be understood that the invention is not limited to the exact details of construction shown and described, as it is obvious that various modifications thereof within the scope of the claims will occur to persons skilled in the art.

This invention relates to large railway box cars known as "automobile cars" having one of their end walls composed of doors to facilitate the loading or unloading of automotive cars and trucks or the like. Such an arrangement materially weakens the car framing to resist the service stresses. It is difficult to design the end frame of such a car, the attachments of the doors and the doors themselves so as to resist the weaving stresses of the car in service and the shifting cargo and at the same time obtain a door which is easy to operate, weatherproof and burglarproof and which, when open, will give an opening as wide as the inside of the car. Automobile cars are used in general service so must be capable of carrying various types of lading as well as those mentioned above.

Such doors are necessarily very large and heavy as not more than two of them must cover the entire area of the end wall of the car and they are frequently made of ¼" steel plates which are corrugated or reinforced with stiffening members and are lined with 13/16" wooden sheathing. Very frequently such doors become very difficult to close because the bottom edge of one or both of the doors droops below the threshold, thus making it necessary to raise the door with a crow-bar or some similar means before the door can be moved into fully closed position. The bottom edge of the door becomes lower than the threshold from one or more causes; for instance, the door may get out of square or sag, as it is called, or the end frame of the car (end sill, end plate and corner post) may get out of square due to the lateral weaving of the car or the end sill may droop, etc.

An object of the invention is to eliminate one of the principal difficulties in closing sagged vertically hinged doors or in closing such vertically hinged doors in which a part of the bottom edge thereof for any reasons whatsoever is lower than the threshold of the opening for the door.

Another object is to provide a roller which engages a runway and raises the door until its bottom edge is at least as high as the threshold and retains it at such elevation until the door is swung partially over the threshold and still another object is to so arrange the roller and runway that upon any additional closing movement of the door the roller and runway are disengaged so that they are relieved of any weight of the door.

Another object is to provide an upwardly and inwardly inclined threshold so that after the engagement of the roller with the runway has raised the door and it has been moved toward the car until it is partially over the threshold any additional closing movement of the door will cause it to ride up on the inclined threshold and disengage the roller and runway so that they are relieved of any weight of the door.

In the drawings:

Fig. 1 shows a car with my device applied thereon.

Fig. 2 is a section on line 2—2 of Fig. 1.

Fig. 3 is an enlarged section on line 3—3 of Fig. 1.

Fig. 4 is a complete elevation of Fig. 3.

Figs. 5 to 17 inclusive are diagrams showing the relation of the principal elements of the device in its several positions and modified forms.

The usual parts of the car are shown wherein 1 is the end sill; 2 the end plate; 3 the corner post; 4 the striking casting; 5 the draft sill and 6 and 7 the doors which are vertically hinged to the corner post or side wall of the car.

In the preferred form my device comprises a roller mounted on the door 6—7 which upon closing movement of the door engages a runway on the car body (the end sill, striking casting, draft sill or any other part adjacent the bottom edge of the door) which runway is positioned and dimensioned so that the engagement of the roller with the runway raises the door until it is in as high a plane as the threshold and retains it in such elevated position until the door is partially over the threshold. The runway is preferably also so arranged that upon further closing movement of the door the roller is relieved of any weight of the door so that the door rests upon the threshold.

Figure 5:
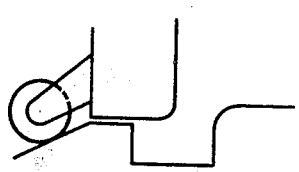
Figure 6:
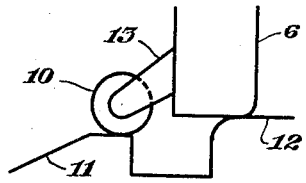
Figure 7:
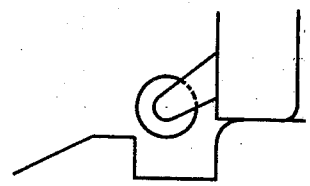

Figs. 5, 6 and 7 show the preferred form. Fig. 5 shows the roller 10 just as it engages the runway 11. Fig. 6 shows the roller at the top of the runway with the door partially over the threshold 12 and Fig. 7 shows the door completely closed with the roller relieved of any weight of the door. Numeral 13 indicates a roller bracket.

Figure 8:
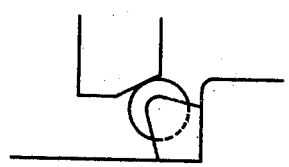
Figure 9:
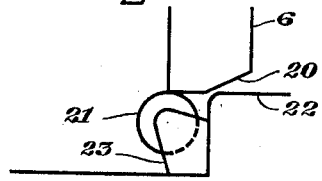
Figure 10:
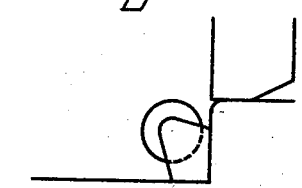

Figs. 8, 9 and 10 show the roller mounted on the car instead of the door and the runway on the door instead of on the car. These figures show the same relation of the elements as Figs. 5, 6 and 7, respectively. Fig. 8 shows the runway 20 just as it engages the roller 21. Fig. 9 shows the door at the top of the roller with the door partially over the threshold 22 and Fig. 10 shows the door completely closed with the roller relieved of any weight of the door. Numeral 23 indicates a roller bracket.

In the modified form shown in Figs. 10 to 16 inclusive the roller engages the runway and raises the door until its bottom edge is in as high a plane as the threshold and retains it in such elevated position until the door is partially over the threshold. The threshold is inclined upwardly and inwardly so that upon further closing movement of the door it raises up on the threshold and relieves the roller of any weight of the door.

Figure 11:
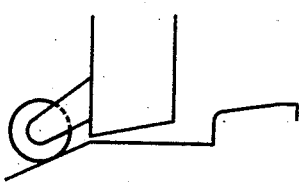
Figure 12:
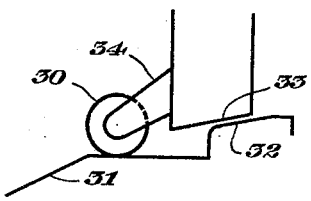

Fig. 10 shows the roller 30 just as it engages the runway 31 and Fig. 11 shows the roller at the top of the runway and the door partially over the inclined threshold 32. Fig. 12 shows the door completely closed with the roller relieved of any weight of the door. The bottom edge of the door may be correspondingly inclined, as shown at 33. Numeral 34 indicates a roller bracket.

Figure 13:
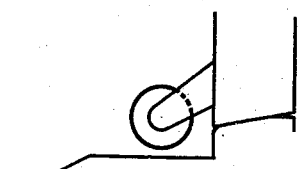
Figure 14:
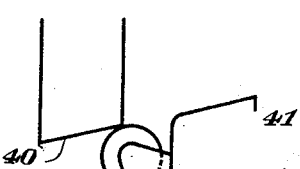
Figure 15:
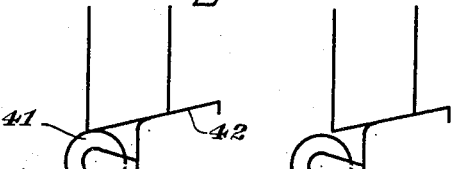
Figure 16:
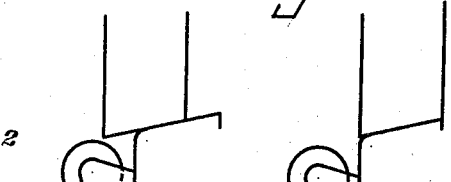
Figure 17:
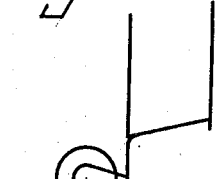

Figs. 13, 14, 15 and 16 show the roller mounted on the car instead of the door and the runway on the door instead of on the car. These figures show the same relation of the elements as Figs. 10, 11 and 12, respectively. Fig. 13 shows the runway 40 just as it engages the roller 41. Fig. 14 shows the door at the top of the roller with the door partially over the threshold 42. Fig. 15 shows how the inclined threshold raises the door off of the roller, thus relieving the roller of any weight of the door. Fig. 16 shows the door completely closed. Numeral 43 indicates a roller bracket.

I claim:

1. The combination of a railway car, a vertically hinged door, a roller mounted on one of said elements, and a runway mounted on the other of said elements, said roller and runway so positioned and dimensioned that upon a closing movement of the door the roller engages the runway and raises the door until it is partially over the threshold of the opening for the door, the runway arranged so that upon further closing movement of the door the roller is relieved of any weight of the door.

2. The combination of a railway car, a vertically hinged door, a roller mounted on one of said elements, and a runway mounted on the car, said roller and runway so positioned and dimensioned that upon a closing movement of the door the roller engages the runway and raises the door until it is partially over the threshold of the opening for the door, the said threshold being inclined upwardly and inwardly so that upon further closing movement of the door the roller is relieved of any weight of the door.

GARTH G. GILPIN.